United States Patent [19]

Watson et al.

[11] Patent Number: 4,525,124
[45] Date of Patent: Jun. 25, 1985

[54] BALANCED STRESS VERTICAL AXIS WIND TURBINE

[76] Inventors: Thomas A. Watson; Philip Watson, both of Box 173 Stn. A, Rexdale Ont, Canada, M9W 5L1

[21] Appl. No.: 494,295

[22] Filed: May 13, 1983

Related U.S. Application Data

[63] Continuation-in-part of Ser. No. 385,883, Jun. 7, 1982, abandoned.

[51] Int. Cl.$^3$ .............................................. F03D 3/06
[52] U.S. Cl. ................................ 416/132 B; 416/119; 416/DIG. 8
[58] Field of Search ............. 416/DIG. 8, 132 B, 119, 416/227 A

[56] References Cited

U.S. PATENT DOCUMENTS

| | | | |
|---|---|---|---|
| 1,820,529 | 8/1931 | Darrieus | 416/DIG. 8 X |
| 4,050,246 | 9/1977 | Bourquardez | 416/132 B X |
| 4,130,380 | 12/1978 | Kaiser | 416/132 B X |
| 4,204,805 | 5/1980 | Bolie | 416/119 |
| 4,247,253 | 1/1981 | Seki et al. | 416/119 X |
| 4,264,279 | 4/1981 | Dereng | 416/DIG. 8 X |
| 4,293,279 | 10/1981 | Bolie | 416/227 A |
| 4,329,116 | 5/1982 | Ljungström | 416/132 B X |
| 4,421,458 | 12/1983 | Allan et al. | 416/132 B X |

FOREIGN PATENT DOCUMENTS 2298707  8/1976  France .......................... 416/DIG. 8

Primary Examiner—Everette A. Powell, Jr.

[57] ABSTRACT

Curved airfoils are mounted on members attached to a vertical shaft. The ends of the airfoils point outward from the shaft. The members are attached to the upper and lower sections of the airfoils and converge as they approach the shaft. This minimizes the shaft length above the turbines upper most bearing and provides a balanced condition that distributes forces in such a manner which reduces airfoil stress.

9 Claims, 4 Drawing Figures

BALANCED STRESS VERTICAL AXIS WIND TURBINE

This is a continuation-in-part application of application Ser. No. 385,883 filed 6-7-82, now abandoned.

The invention relates to vertical axis wind turbines having airfoils radially disposed about their axis of rotation, wherein airfoil stress is balanced against reaction forces. The length of the shaft above the upper most bearing of a vertical axis wind turbine, having no support structure above its airfoils, is usually one half the length of its airfoils. This results in a large bending moment on the shaft, hence its diameter must be made large for the power it handles. In this type of turbine members are used to connect the airfoils to the vertical shaft. In the vertical axis wind turbine using a troposkein shape, a supporting structure such as guy wires must be employed or a very thick shaft used. In the present invention airfoil stress due to centrifugal forces is balanced against reaction forces set up in the members used to connect them to the shaft. To provide this condition these members must converge as they approach the shaft. This will permit the use of a relatively short shaft above its upper most bearing, thus reducing shaft diameter and bearing size.

An objective of the invention is to reduce airfoil stress as compared to what it would be in a vertical axis wind turbine using straight airfoils.

Another objective is to reduce shaft diameter and bearing size.

An objective of the invention is to provide a vertical axis wind turbine which has a relatively small diameter vertical shaft.

Another objective is to reduce airfoil stress as compared to what it would be in a vertical axis wind turbine using straight airfoils.

Also another objective is to reduce airfoil stress when the wind turbine is parked.

Still another objective is to provide a cost effective wind turbine.

Figure 1:
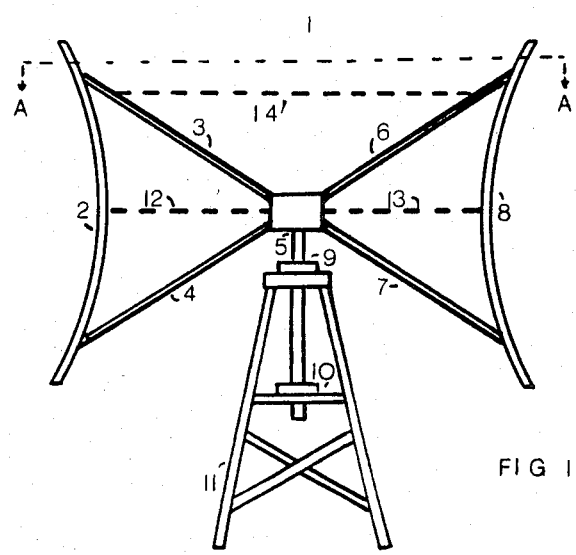
FIG. 1 is a front view of the present invention showing a balanced stress vertical axis wind turbine.

FIG. 1 shows a vertical axis wind turbine 1 having an airfoil 2 attached by members or arms 3 and 4 to shaft 5. Airfoil 8 is similarly attached to shaft 5 by members 6 and 7. Shaft 5 rotates in bearings 9 and 10 which are mounted on tower 11. Members 12 and 13 are attached to airfoils 2 and 8 respectively and are also connected to shaft 5; they are optional. Member 14 is attached to members 3 and 6, it is also optional. The operation of airfoils 2 and 8 is identical, hence airfoil 2 will only be discussed.

When wind turbine 1 rotates centrifugal forces tend to pull airfoil 2 away from shaft 5. The middle section of airfoil 2 tends to buckle outward due to this centrifugal force. Members 3 and 4 tend to oppose the outward buckling of airfoil 2, since they converge on shaft 5. Members 3 and 4 also tend to come together as a result of centrifugal force. The upper and lower ends of airfoil 2 away from its points of attachment to members 3 and 4 also react against the buckling of airfoil 2's middle section. Members 3 and 4 maybe airfoils. this will reduce drag and provide some lift.

Weight distribution, the curvature of airfoil 2, the points of attachment of members 3 and 4 and their angle with respect to airfoil 2 can be set to provide a balanced condition. This will minimize stress.

Figure 2:
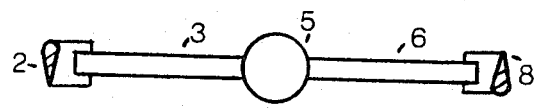
FIG. 2 is a plan view of FIG. 1 through section A—A.
Figure 3:
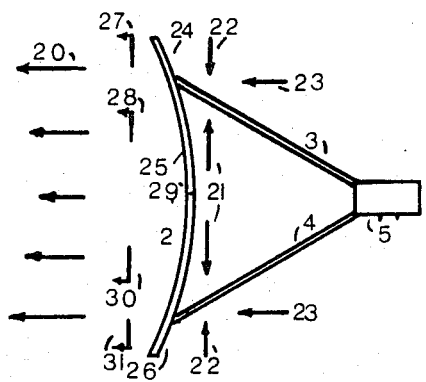
FIG. 3 is a vector diagram of forces on the wind turbine of FIG. 1.

FIG. 2 shows airfoil 2 attached by members 3 and 4 to shaft 5. The arrows 20, 21, 22 and 23 are force vectors. Airfoil 2 is subdivided into end sections 24 and 26 and middle section 25. Arrows 27, 28, 30 and 31 are moments and point 29 is the center of airfoil 2.

The vector 20 due to centrifugal action is greater near its end, since they are further away from shaft 5 than airfoil 2's center. The end sections 24 and 26 tend to pivot about the points of attachment of members 3 and 4 respectively. This is due to the different strength of force vectors acting on them. This results in moments 27 and 31 being developed about the points of attachment. The centrifugal forces acting on center section 25 tend to cause it to buckle outward producing vector 21. The tension in members 3 and 4 is broken down into horizontal forces 23 and vertical forces 22. Vector 21 is opposed by vector 22 and moments 27 and 31 in sections 24 and 26.

In the middle section the vectors are longer near the points of attachment to members 3 and 4 than near center 29. This results in moments 28 and 30 being developed about center 29 of airfoil 2. The more the curvature of airfoil 2 the larger are the moments 28 and 30.

Moments 27, 28, 30 and 31 and vector 22 opposes vector 21. They can be made to balance each by the proper selection of parameters, thus minimizing airfoil stress.

Outer sections 24 and 26 maybe eliminated. In this case moments 28 and 30 and vector 22 can be designed to cancel vector 21. Also members 3 and 4 contribute to vector 21. To minimize airfoil stress no attachments should be made to the outer ends of sections 24 and 26.

In order for vector 22 to exist members 3 and 4 must converge on shaft 5. This reduces the length of shaft 5 above the upper most bearing 9. The moments on this shaft are considerably less than that of a wind turbine using parallel members to attach airfoils to its vertical shaft. This allows the diameter of shaft 5 to be minimized, simultaneously reducing the size of bearings 9 and 10.

The airfoils assume a simple curvature as a result of centrifugal forces. If straight airfoils are employed they would assume a compound curvature, due to centrifugal action. Their end and middle sections would be pulled outward and the points of attachment of the members would pull inwards. This would result in higher stress than would be present in the turbine of FIG. 1. In the parked condition the wind forces on an up wind airfoil would not result in airfoil buckling, as would be the case if troposkein or straight airfoils were employed.

An airfoil parked down wind would tend to buckle outward. This is opposed by the inward vertical force components set up in the members to which they are attached. The members in this situation are in tension, whereas in the upwind case the members were in compression.

In general aerodynamic forces are less than centrifugal forces. Parked wind loads way above cutout speed are inline with aerodynamic forces. Also the frequency of occurance of high wind speeds, which necessitates parking is low.

Members 12 and 13 are optional. If the airfoils 2 and 8 are sufficiently stiff these members will not be required. However aerodynamic forces will cause some cyclic unbalance to occur, since they are different in the down wind and up wind positions of the airfoils. Members 12 and 13 can be employed to resist these forces. The turbines can be designed such that when running these members are always in tension.

Members 12 and 13 could be made rigid compression members, whereas members 3,4,6 and 7 could be tensile members only. Stress can be balanced by proper design. Airfoil bending stress however is very large when parked in heavy winds. Member 14 maybe employed to balance the weight of airfoils 2 and 8 against each other. It would normally be in tension. Although only two airfoils are shown, three or more airfoils maybe similarly arranged. A single airfoil with a suitable counter balance could also be employed.

Figure 4:
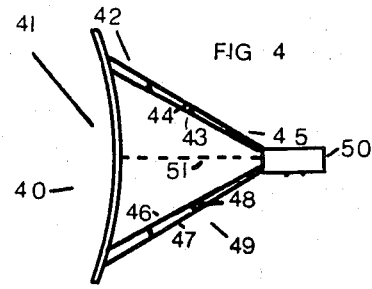
FIG. 4 is a partial front view of a vertical axis wind turbine employing reinforced interconnecting members.

FIG. 4 shows a wind turbine 40 having an airfoil 41. Strips 42 and 43 are interconnected by rods 44 to form a rigid member 45 which will stand both compressive and tensile forces. Similarly strips 46 and 47 are interconnected by rods 48 to form a rigid member 49. Strips 42,43,46 and 47 should have an airfoil cross section to reduce drag. Airfoil 41 is connected to shaft 50 by members 45 and 49. Member 51 connects the center of airfoil 41 to shaft 50. Members 45 and 49 exhibit a minimal profile drag for a structure that resists compression. They should be straight as opposed to being arched, so as to minimize structural requirements. By making members 45 and 49 rigid they will not buckle when a parked upwind airfoil is subjected to a high wind, it will also miminize vibration. This is a perferred arrangement. Member 51 when used, maybe employed to resist cyclic stresses by acting as a tensile member. It could be made a rigid compression member.

It is to be understood that the form of the invention herein shown and described is to be taken as a preferred example of the same and that various changes in the shape size and arrangement of parts maybe resorted to without departing from the spirit of the invention or the scope of the subjoined claims.

I claim:

1. A vertical axis wind turbine comprising a shaft mounted for rotation about a vertical axis, diagonal radial arms connected in pairs to the shaft and angularly spaced about the shaft, each pair of arms arranged to diverge as they extend outward from the shaft, each pair of arms have connected to its outer ends an airfoil, the airfoil curved and mounted vertically with its ends pointing away from the shaft; wherein upon rotation a vertical outward force vector is developed in the airfoil, also a vertical inward force vector is developed by the pull in the diagonal arms which is superimposed upon the airfoil, the airfoil and the diagonal arm's parameters are set so that the inward and the outward vertical forces on the airfoil substantially counterbalance each other.

2. A vertical axis wind turbine comprising a shaft mounted for rotation about a vertical axis, diagonal radial arms connected in pairs to the shaft and angularly spaced about the shaft, each pair of arms arranged to diverge as they extend outward from the shaft, each pair of arms have connected to its outer ends one airfoil only, the airfoil curved and mounted vertically with its ends pointing away from the shaft; wherein upon rotation a vertical outward force vector is developed in the airfoil, also a vertical inward force vector is developed by the pull in the diagonal arms which is superimposed upon the airfoil, the airfoil and the diagonal arm's parameters are set so that the inward and the outward vertical forces substantially counterbalance each other.

3. A vertical axis wind turbine as claimed in claimed in claim 1, wherein the moments developed in the airfoils between the point of connection of the arms to the airfoil and the airfoils ends provides an additional inward force on the airfoil, which in conjunction with the vertical inward force from the diagonal arms, substantially couterbalances the vertical outward force developed in the airfoils.

4. A vertical axis wind turbine as claimed in claim 1 wherein a member is connected substantially to the center of one or more of the airfoils and to the shaft.

5. A vertical axis wind turbine as claimed in claim 1 wherein the arms are attached to the ends of the airfoils.

6. A vertical axis wind turbine as claimed in claim 1 wherein the arms are attached away from the airfoil's ends.

7. A vertical wind turbine as claimed in claim 1 wherein the arms connecting the airfoils to the shaft are airfoil sections.

8. A vertical axis wind turbine as claimed in claim 1 wherein the arms each comprise two or more elongated strips spaced a short distance apart compared to their length, and are interconnected by struts at intervals throughout their length.

9. A vertical axis wind turbine as claimed in claim 8 wherein the strips have airfoil sections.

* * * * *